(12) United States Patent
Zheng

(10) Patent No.: US 12,225,490 B2
(45) Date of Patent: Feb. 11, 2025

(54) NETWORK ELEMENT REGISTRATION METHOD AND SYSTEM, AND NETWORK FUNCTION REPOSITORY FUNCTION

(71) Applicant: ZTE Corporation, Shenzhen (CN)

(72) Inventor: Xingyou Zheng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 378 days.

(21) Appl. No.: 17/632,354

(22) PCT Filed: Jul. 21, 2020

(86) PCT No.: PCT/CN2020/103239
§ 371 (c)(1),
(2) Date: Feb. 2, 2022

(87) PCT Pub. No.: WO2021/031770
PCT Pub. Date: Feb. 25, 2021

(65) Prior Publication Data
US 2022/0295439 A1    Sep. 15, 2022

(30) Foreign Application Priority Data
Aug. 19, 2019    (CN) .......................... 201910772600.2

(51) Int. Cl.
*H04W 60/00* (2009.01)
*H04W 8/00* (2009.01)
*H04W 48/18* (2009.01)

(52) U.S. Cl.
CPC ........... *H04W 60/00* (2013.01); *H04W 8/005* (2013.01); *H04W 48/18* (2013.01)

(58) Field of Classification Search
CPC ..... H04W 60/00; H04W 8/005; H04W 48/18; H04W 88/18; H04L 65/1073; H04L 67/51
See application file for complete search history.

(56) References Cited

U.S. PATENT DOCUMENTS

2019/0141606 A1    5/2019    Qiao et al.
2019/0150081 A1    5/2019    Qiao et al.
(Continued)

FOREIGN PATENT DOCUMENTS

| CN | 110086652 A | 8/2019 |
| CN | 110121194 A | 8/2019 |
| WO | 2019138133 A1 | 7/2019 |

OTHER PUBLICATIONS

International Searching Authority. International Search Report and Written Opinion for PCT Application No. PCT/CN202/109239 and English translation, mailed Oct. 28, 2020, pp. 1-11.
(Continued)

*Primary Examiner* — Marcus Hammonds
(74) *Attorney, Agent, or Firm* — Vivacqua Crane, PLLC

(57) ABSTRACT

A network element registration method and system, and a Network Function Repository Function (NRF) are disclosed. The network element registration method may include: receiving, by a Network Function Repository Function (NRF), a registration request of a NRF extra-domain service provider network element, the registration request includes service identification information of the NRF extra-domain service provider network element; and allocating, in response to the registration request, a first network element instance ID for the NRF extra-domain service provider network element, the first network element instance ID is different from a second network element instance ID allocated by the NRF for a NRF intra-domain service provider network element.

8 Claims, 2 Drawing Sheets

(56) References Cited

U.S. PATENT DOCUMENTS

2019/0230556 A1* 7/2019 Lee .................. H04W 28/16
2019/0253894 A1 8/2019 Bykampadi et al.

OTHER PUBLICATIONS

3GPP Technical Specification Group Service and System Aspects. "Solution Proposal 'Improvements to the Service Framework' to Address Key Issue 'Improvements to Service Framework Related Aspects,'" 3GPP SA-WG2 Meeting #128, issued Jul. 6, 2018, pp. 1-2.

3GPP Technical Specification Group Service and System Aspects. "Update and Evaluation to Solution 14/15," 3GPP SA-WG2 Meeting #129, issued Oct. 19, 2018, pp. 1-8.

3GPP Technical Specification Group Core Network and Terminals. "Pseudo-CR on Requirements for NF service discovery and selection," 3GPP TSG Ct4 Meeting, May 2017, pp. 1-4.

European Patent Office. Extended European Search Report for EP Application No. 20854814.9, mailed Sep. 21, 2022, pp. 1-9.

Intellectual Property India. Examination Report for IN Application No. 202227014880 and English translation, mailed Sep. 6, 2022, pp. 1-7.

* cited by examiner

NETWORK ELEMENT REGISTRATION METHOD AND SYSTEM, AND NETWORK FUNCTION REPOSITORY FUNCTION

CROSS-REFERENCE TO RELATED APPLICATION

This application is a national stage filing under 35 U.S.C. § 371 of international application number PCT/CN2020/103239, filed Jul. 21, 2020, which claims priority to Chinese patent application No. 201910772600.2, filed Aug. 19, 2019. The contents of these applications are incorporated herein by reference in their entirety.

TECHNICAL FIELD

The present disclosure relates to the field of communication, and more particularly, to a network element registration method and system, and a Network Function Repository Function (NRF).

BACKGROUND

The Network Function (NF) Repository Function (NRF) is a network element in the 5G core network (5GC). The network element provides network element registration, service discovery and authentication functions for a service provider network element. The NRF network element defines two groups of services. One group of services provides network element registration management, network element status subscription and notification, network element heartbeat/keep-alive function, and the other group of services provides service discovery function. In the existing NRF service registration process, the service provider network element is required to support the registration interface and the heartbeat/keep-alive interface of NRF. The support of these interface functions requires the service provider network element to be upgraded to meet the registration requirements of NRF, and the equipment upgrade cost is high.

Currently, there is no effective solution to the problem that the service provider network element that does not support the NRF network element registration interface in the existing technologies needs high-cost upgrade to meet the registration requirements.

SUMMARY

The present disclosure provides a network element registration method and system, and a NF repository function (NRF), to solve the problem that the network element of the service provider that does not support the NRF network element registration interface in the existing technologies needs high-cost upgrade to meet the registration requirements.

In an aspect, an embodiment of the present disclosure provides a network element registration method, which includes: receiving, by a NF repository function (NRF), a registration request of a NRF extra-domain service provider network element, the registration request includes service identification information of the NRF extra-domain service provider network element; and allocating, in response to the registration request, a first network element instance ID for the NRF extra-domain service provider network element, the first network element instance ID is different from a second network element instance ID allocated by the NRF for a NRF intra-domain service provider network element.

In an aspect, an embodiment provides a NF repository function (NRF). The NRF receives a registration request of a NRF extra-domain service provider network element. The registration request includes service identification information of the NRF extra-domain service provider network element, and the NRF allocates, in response to the registration request, a first network element instance ID for the NRF extra-domain service provider network element. The first network element instance ID is different from a second network element instance ID allocated by the NRF for a NRF intra-domain service provider network element.

In an aspect, an embodiment of the present disclosure further provides a network element registration system, which includes a NF repository function (NRF), a NRF extra-domain service provider network element, and a NRF intra-domain service provider network element. The NRF receives a registration request of a NRF extra-domain service provider network element, the registration request includes service identification information of the NRF extra-domain service provider network element; and the NRF allocates, in response to the registration request, a first network element instance ID for the NRF extra-domain service provider network element. The first network element instance ID is different from a second network element instance ID allocated by the NRF for a NRF intra-domain service provider network element.

BRIEF DESCRIPTION OF DRAWINGS

The accompanying drawings are intended for providing a further understanding of the technical schemes herein, and constitute a part of the description. The accompanying drawings are intended for explaining the technical schemes herein together with the embodiments herein, and do not constitute a limitation on the technical schemes herein.

DETAILED DESCRIPTION

In order to make the objectives, technical schemes and advantages of the present disclosure clearer, the embodiments of the present disclosure will be described in detail below with reference to the accompanying drawings. It is to be noted that embodiments in the present application and characteristics in the embodiments may be combined to derive other embodiments not explicitly described.

The steps shown in the flowchart of the accompanying drawings may be executed in a computer system such as a set of computer-executable instructions. Further, although the logical order is shown in the flowchart, in some cases, the steps shown or described may be performed in a different order than here.

Figure 1:
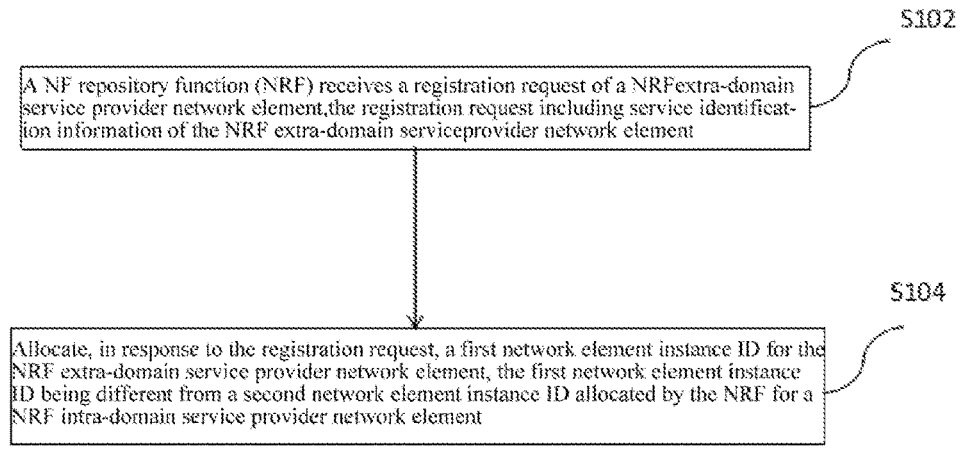
FIG. 1 is a flow diagram of a network element registration method in a first embodiment of the present disclosure.

A first embodiment of the present disclosure provides a network element registration method. The flow of this method is shown in FIG. 1, which includes the following steps of S102 and S104.

At S102, a NF repository function (NRF) receives a registration request of a NRF extra-domain service provider network element. The registration request includes service identification information of the NRF extra-domain service provider network element. The registration request may be a registration request for manual registration or a registration request for manual automatic process registration, which is different from a current registration request that the NRF intra-domain service provider network element itself supports a NRF registration interface and a heartbeat/keep-alive interface.

In this embodiment, both automatic registration and manual registration are supported in NRF. For a service provider network element (which may also be called a NRF intra-domain service provider network element) that support the registration interface of NRF, automatic registration may be used for management, and for a NRF extra-domain service provider network element that cannot support the registration interface of NRF, manual registration may be used for management, and manual registration of the NRF extra-domain network element may also be completed by the automatic registration flow. The manual registration method does not require the NRF extra-domain service provider network element to support the NRF's registration interface and heartbeat/keep-alive interface, but performs manual configuration instead of automatic registration of such network elements. When the NRF supports the manual registration, the service provider network elements may be directly managed by the NRF without any changes, and the service discovery function is supported. The main implementation scenarios of this scheme include but are not limited to the following.

Scenario one: Service provider network elements in 5GC area that do not support automatic registration to NRF, such as Charging Function (CHF) entities in 5GC, are manually configured on the NRF, and the NRF uniformly allocates network element Instance Identity (ID) to them to provide service discovery services for such network elements.

Scenario two: Service provider network elements from different manufacturers that cannot be automatically registered to NRF network elements, such as network elements whose automatic registration interface between the NRF and service provider network elements from different manufacturers cannot be opened due to interface compatibility and other reasons, are manually configured on NRF, and the NRF uniformly allocates network element instance IDs to them to provide service discovery services for such network elements.

Scenario three: Temporary management of service provider network elements outside the scope of this NRF. For example, the NRF of province A serves the network elements of province A and the NRF of province B serves the network elements of province B. However, due to the failure of the NRF of province B, the NRF of province A is required to temporarily manage the service discovery of the service provider network elements of province B. These network elements are manually configured on the NRF, and the NRF uniformly allocates the network element instance IDs to them to provide service discovery services for such network elements.

Scenario four: Service discovery of 5GC extra-domain service provider network elements. For example, an Access and Mobility Management Function (AMF) network element and Mobility Management Entity (MME) interoperate between 5G and 4G through a N26 interface in the way of service discovery, so as to implement the business continuity when switching between 5G and 4G networks. These network elements are manually configured on the NRF, and the NRF uniformly allocates network element instance IDs to them, so as to provide service discovery services for such network elements.

The above service identification information at least includes one of the following information: type information of a network function entity, fully qualified domain name information, IP address information of the network function entity, name of a service supported by the NRF extra-domain service provider network element, service parameter supported by the NRF extra-domain service provider network element, permanent user identification range, universal public user identification range, and location information of the NRF service extra-domain provider network element.

At S104, in response to the registration request, a first network element instance ID is allocated for the NRF extra-domain service provider network element, the first network element instance ID is different from a second network element instance ID allocated by the NRF for a NRF intra-domain service provider network element.

The NRF supports the automatic allocation management of the instance ID of the NRF extra-domain service provider network element. In order to avoid conflict of instance ID allocation inside the NRF, the instance ID of the NRF extra-domain service provider network element of NRF is marked as the first network element instance ID, and the allocated instance ID of the NRF intra-domain service provider network element is marked as the second network element instance ID. In this way, the intra-domain and extra-domain network elements are separately identified, so that during the subsequent service discovery, the network element identified by the second network element instance ID is automatically registered and subjected to heartbeat/keep-alive detection, and the network element identified by the first network element instance ID is set to be permanently online without heartbeat detection.

In this embodiment, a way is that the NRF sets the NRF extra-domain service provider network element to be in a permanent online state, so that the NRF extra-domain service provider network element is not required to support the heartbeat detection interface, and the upgrade of the network element is avoided. After the extra-domain service provider network element completes the NRF registration, the NRF receives a service discovery request from the service user network element, the service discovery request is configured to discover the service identification information of the NRF extra-domain service provider network element, so that the service user network element can obtain all the network element identification information registered on the NRF, to facilitate subsequent service discovery. The NRF receives a subscription request from the service user network element, the subscription request is configured to subscribe to the service identification information of the NRF extra-domain service provider network element. When the service identification information changes, a service identification information change notification is sent to the service user network element, so that the NRF can timely update the service identification information of the intra-domain and extra-domain service provider network elements, and timely discover and adjust the service provider network element as needed.

The above-mentioned network element registration method provided by this embodiment can enable the NRF service provider network element which does not support the NRF extra-domain network element registration interface to meet the requirement that the service user network element automatically discovers the service provided by the NRF extra-domain service provider network element through the service discovery interface by manually registering on the NRF. By virtue of the NRF area element registration function, the service discovery capability can be fully expanded and supported across networks, areas and manufacturers.

Figure 2:
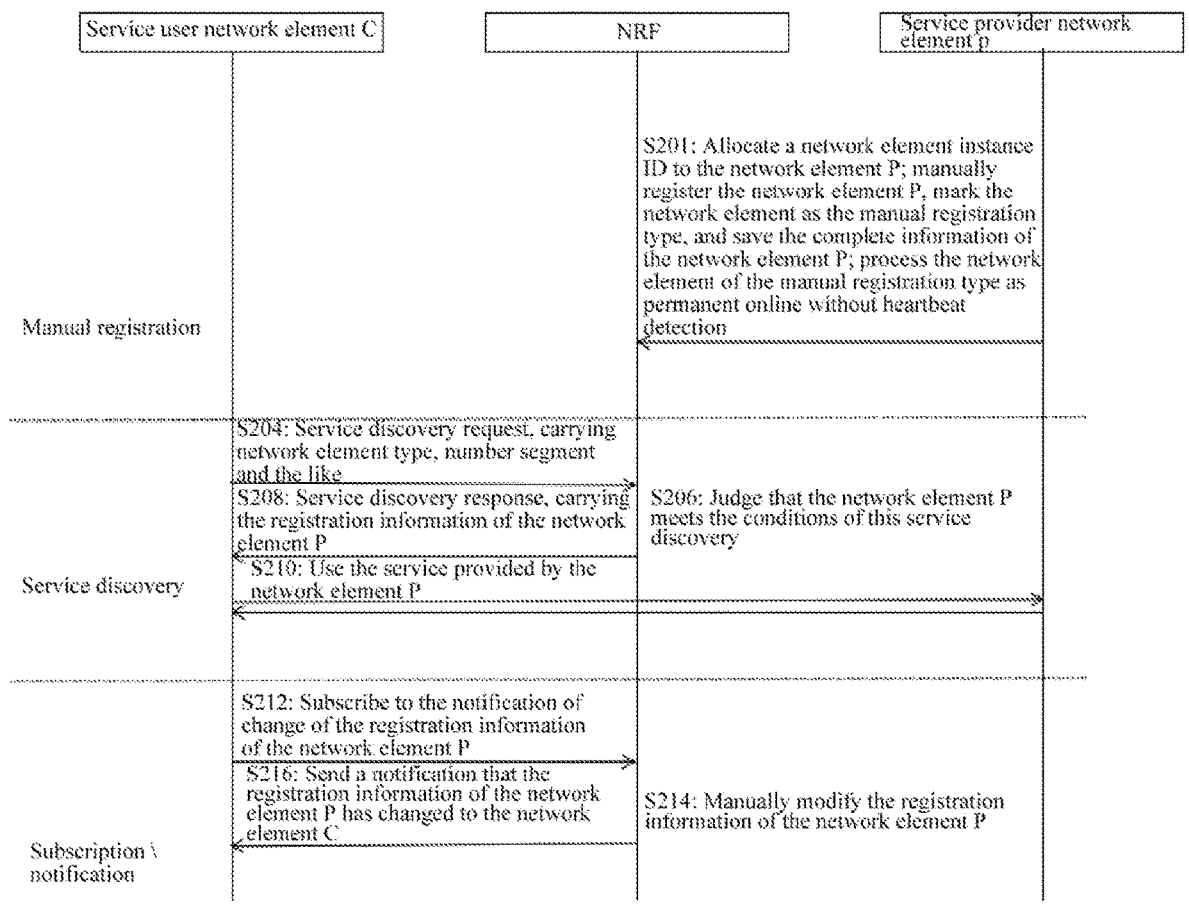
FIG. 2 is a flow diagram of another network element registration method in a second embodiment of the present disclosure.
Figure 3:
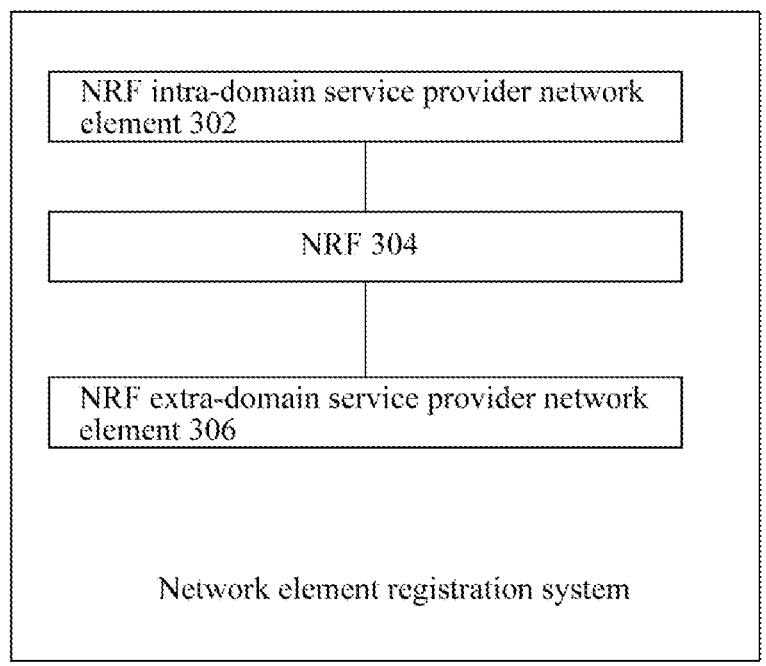
FIG. 3 is an architecture diagram of a network element registration system in a third embodiment of the present disclosure.

A second embodiment of the present disclosure provides another network element registration method. Referring to FIG. 2, the service provider network elements are 5GC intra-domain general network elements and extra-domain network elements, which provide standard services to the outside. The service user network element is a 5GC intra-domain general network element which, according to the needs of business process, calls the service discovery interface of the NRF to obtain and use the services supported and provided by the service provider network element. The NRF is a 5GC standard network element, which provides standard services such as service registration, service discovery and authentication. The NRF supports both automatic registration and manual registration of network elements. The NRF supports the NRF extra-domain network element service discovery function and the automatic allocation management of the extra-domain network element instance ID. This ID may be independent of the ID of the NRF intra-domain network elements to avoid conflicts. The NRF processes network elements of a manual registration type as permanent online without heartbeat detection.

The network element registration method includes the following steps of S202, S204, S206, S208, S210, S212, S214 and S216.

At S202, a network element P is manually registered, a network element instance ID is allocated for the network element P, the network element P is marked as a manual registration type, complete information of the network element P is saved, and the network element of the manual registration type is processed as permanent online without heartbeat detection.

At S204, during business processing, a service user network element C calls the service discovery interface of the NRF as needed and sends a service discovery request to the NRF, the request carrying data related to the network element registration information such as network element type and number segment for service discovery.

At S206, after the NRF receives the service discovery request, if it is determined that the network element P meets the conditions of this service discovery, registration information of the network element P is carried in the service discovery response message.

At S208, after receiving the service discovery response carrying the registration information of the network element P, the network element C performs corresponding business processing through the registration information of the network element P.

At S210, when the registration information of the network element P meets the service discovery requirements, the service provided by the network element P is used, and this service discovery process for the network element P ends.

According to some embodiments, NRF supports extra-domain network element subscription and notification management. An administrator manually registers the service provider network element P on the NRF, and the NRF allocates an ID to the service provider. The network element is marked as a network element of a manual registration type in the NRF, to distinguish it from a network element of an automatic registration type. The administrator inputs a complete information network function profile (NF profile) of the network element P in NRF. The NF profile includes network function entity type information (NF type), fully qualified domain name (FQDN) information, an IP address of network function entity (NF), name of a supported service, or other service parameters. If the consumer is UDR, besides the above information, the NF profile should further include subscription permanent identifier (SUPI) range, general public subscription identifier (GPSI) range, location information, and the like. The NRF saves the registration information of the service provider network element P.

At S212, the service user network element C subscribes to a notification of change of the registration information of the network element P by calling a subscription interface of NRF.

At S214, when the NRF manually modifies the registration information of the network element P, the NRF sends the notification of change of the registration information of the network element P to the network element C.

At S216, NRF sends the notification of change of the registration information of the network element P to the network element C, and the network element C performs corresponding business processing.

A third embodiment of the present disclosure provides a NF repository function (NRF), which is characterized in that the NRF receives a registration request of a NRF extra-domain service provider network element, the registration request including service identification information of the NRF extra-domain service provider network element, and the NRF allocates, in response to the registration request, a first network element instance ID for the NRF extra-domain service provider network element, the first network element instance ID being different from a second network element instance ID allocated by the NRF for a NRF intra-domain service provider network element.

In some embodiments, the NRF extra-domain service provider network element includes a service provider network element that does not support a registration interface of the NRF. The service identification information includes at least one of the following information: type information of a network function entity, fully qualified domain name information, IP address information of the network function entity, name of a service supported by the NRF extra-domain service provider network element, service parameter supported by the NRF extra-domain service provider network element, permanent user identification range, universal public user identification range, or location information of the NRF service extra-domain provider network element.

The implementation process of the above-mentioned NRF is the same as the implementation process of the network element registration method in the previous embodiment, and will not be repeated here.

A fourth embodiment of the present disclosure provides a network element registration system, which is characterized in that the system includes a NRF 304, a NRF extra-domain service provider network element 306 and a NRF intra-domain service provider network element 302. The NRF 304 receives a registration request of the NRF extra-domain service provider network element 306, the registration request including the service identification information of the NRF extra-domain service provider network element 306. The NRF 304 allocates, in response to the registration request, a first network element instance ID for the NRF extra-domain service provider network element 306, the first network element instance ID being different from a second network element instance ID allocated by the NRF 304 for a NRF intra-domain service provider network element 302.

The implementation process of the above-mentioned network element registration system is the same as the implementation process of the network element registration method in the previous embodiment, and will not be repeated here.

A fifth embodiment of the present disclosure provides a computer-readable storage medium storing a computer program which, when executed by a processor, causes the processor to perform the steps of any of the network element registration methods as described in the first embodiment of the present disclosure. The details may be understood with reference to the first embodiment and the second embodiment herein, and will not be discussed in detail here.

The technical schemes provided by the embodiments of present disclosure can avoid the high-cost registration and upgrade of NRF extra-domain network elements, and solve the problem that the service provider network elements that do not support the NRF network element registration interface in the existing technology need high-cost upgrade to meet the registration requirements.

It can be understood by a person having ordinary skills in the art that all or some of the steps, functional modules/units in the methods, systems and devices disclosed above may be implemented as software, firmware, hardware and their appropriate combinations. In the hardware implementation, the division between functional modules/units mentioned in the above description does not necessarily correspond to the division of physical components. For example, a physical component may have multiple functions, or a function or a step may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on a computer-readable media, which may include computer storage medium (or a non-transitory medium) or a communication medium (or a transitory medium). As is well known to a person having ordinary skills in the art, the term "computer storage medium" may include a volatile or nonvolatile, removable or non-removable medium implemented in any method or technology for storing information such as a computer readable instruction, a data structure, a program module or other data. The computer storage medium includes, but are not limited to, RAM, ROM, EEPROM, flash memory or other memory technologies, CD-ROM, digital versatile disk (DVD) or other optical disk storage, magnetic cassette, magnetic tape, magnetic disk storage or other magnetic storage devices, or any other media that may be used to store desired information and may be accessed by a computer. In addition, as well-known to a person having ordinary skills in the art, the communication medium generally contains a computer-readable instruction, a data structure, a program module or other data in modulation data signals such as carriers or other transmission mechanisms, and may include any information transfer medium.

What is claimed is:

1. A network element registration method, comprising:
   receiving, by a Network Function Repository Function (NRF), a registration request of a NRF extra-domain service provider network element, wherein the registration request comprises service identification information of the NRF extra-domain service provider network element; and
   allocating, in response to the registration request, a first network element instance ID for the NRF extra-domain service provider network element,
   wherein the first network element instance ID is different from a second network element instance ID allocated by the NRF for a NRF intra-domain service provider network element, the NRF extra-domain service provider network element does not support a registration interface of the NRF, the NRF intra-domain service provider network element supports the registration interface and heartbeat/keep-alive interface of the NRF, the NRF is configured to set the NRF extra-domain service provider network element, identified by the first network element instance ID, to be in a permanent online state, and the NRF is configured to automatically register and subject to heartbeat/keep-alive detection the NRF intra-domain service provider network element, identified by the second network element instance ID.

2. The method of claim 1, wherein the service identification information comprises at least one of the following information: type information of a network function entity, fully qualified domain name information, IP address information of the network function entity, name of a service supported by the NRF extra-domain service provider network element, service parameter supported by the NRF extra-domain service provider network element, permanent user identification range, universal public user identification range, or location information of the NRF service extra-domain provider network element.

3. The method of claim 1, wherein a service discovery request of a service user network element is received, the service discovery request being configured to discover the service identification information of the NRF extra-domain service provider network element.

4. The method of claim 1, wherein a subscription request of a service user network element is received, the subscription request being configured to subscribe to the service identification information of the NRF extra-domain service provider network element.

5. The method of claim 4, further comprising determining a change of the service identification information, and sending a service identification information change notification to the service user network element.

6. A Network Function Repository Function (NRF), wherein the NRF receives a registration request of a NRF extra-domain service provider network element, the registration request comprising service identification information of the NRF extra-domain service provider network element, and
   the NRF is configured to allocate, in response to the registration request, a first network element instance ID for the NRF extra-domain service provider network element,
   the first network element instance ID being different from a second network element instance ID allocated by the NRF for a NRF intra-domain service provider network element, wherein the NRF extra-domain service provider network element does not support a registration interface of the NRF, the NRF intra-domain service provider network element supports the registration interface and heartbeat/keep-alive interface of the NRF, the NRF is configured to set the NRF extra-domain service provider network element, identified by the first network element instance ID, to be in a permanent online state, and the NRF is configured to automatically register and subject to heartbeat/keep-alive detection the NRF intra-domain service provider network element, identified by the second network element instance ID.

7. The NRF of claim 6, wherein the service identification information comprises at least one of the following information: type information of a network function entity, fully qualified domain name information, IP address information of the network function entity, name of a service supported by the NRF extra-domain service provider network element, service parameter supported by the NRF extra-domain service provider network element, permanent user identification range, universal public user identification range, or location information of the NRF service extra-domain provider network element.

8. A network element registration system, comprising a Network Function Repository Function (NRF), a NRF extra-domain service provider network element, and a NRF intra-domain service provider network element; wherein
  the NRF is configured to receive a registration request of the NRF extra-domain service provider network element, the registration request comprising service identification information of the NRF extra-domain service provider network element; and
  the NRF is configured to allocate, in response to the registration request, a first network element instance ID for the NRF extra-domain service provider network element,
  the first network element instance ID being different from a second network element instance ID allocated by the NRF for the NRF intra-domain service provider network element;
  wherein the NRF extra-domain service provider network element does not support a registration interface of the NRF, the NRF intra-domain service provider network element supports the registration interface and heartbeat/keep-alive interface of the NRF, the NRF is configured to set the NRF extra-domain service provider network element, identified by the first network element instance ID, to be in a permanent online state; and
  the NRF is configured to automatically register and subject to heartbeat/keep-alive detection the NRF intra-domain service provider network element, identified by the second network element instance ID.

* * * * *